United States Patent
Komarek et al.

(10) Patent No.: US 11,799,904 B2
(45) Date of Patent: Oct. 24, 2023

(54) MALWARE DETECTION USING INVERSE IMBALANCE SUBSPACE SEARCHING

(71) Applicant: Cisco Technology, Inc., San Jose, CA (US)

(72) Inventors: Tomas Komarek, Frydek-Mistek (CZ); Jan Brabec, Prague (CZ); Cenek Skarda, Bechovice (CZ)

(73) Assignee: Cisco Technology, Inc., San Jose, CA (US)

(*) Notice: Subject to any disclaimer, the term of this patent is extended or adjusted under 35 U.S.C. 154(b) by 370 days.

(21) Appl. No.: 17/117,942

(22) Filed: Dec. 10, 2020

(65) Prior Publication Data
US 2022/0191244 A1 Jun. 16, 2022

(51) Int. Cl.
*H04L 9/40* (2022.01)

(52) U.S. Cl.
CPC ...... *H04L 63/1466* (2013.01); *H04L 63/1416* (2013.01); *H04L 63/1425* (2013.01); *H04L 63/1433* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 7,882,542 B2* | 2/2011 | Neystadt | ............... | H04L 63/308 726/11 |
| 8,671,449 B1* | 3/2014 | Nachenberg | ............ | G06F 21/56 713/188 |
| 9,043,894 B1* | 5/2015 | Dennison | ............ | H04L 63/1408 726/11 |
| 9,112,895 B1* | 8/2015 | Lin | ...................... | H04L 63/1425 |
| 9,245,123 B1* | 1/2016 | Satish | ..................... | G06F 21/50 |
| 9,288,220 B2* | 3/2016 | Raugas | ............... | H04L 63/1416 |
| 9,306,960 B1* | 4/2016 | Aziz | ..................... | G06F 21/554 |
| 9,516,039 B1* | 12/2016 | Yen | ..................... | H04L 63/1425 |
| 9,516,057 B2* | 12/2016 | Aziz | ................... | H04L 63/1491 |
| 9,674,210 B1* | 6/2017 | Oprea | ................. | H04L 63/1433 |

(Continued)

OTHER PUBLICATIONS

Mimura et al.; A Practical Experiment of the HTTP-Based RAT Detection Method in Proxy Server Logs; 2017 12th Asia Joint Conference on Information Security (Year: 2017).*

(Continued)

*Primary Examiner* — Kambiz Zand
*Assistant Examiner* — Mahabub S Ahmed
(74) *Attorney, Agent, or Firm* — Lee & Hayes, P.C.

(57) ABSTRACT

Inverse imbalance subspace searching techniques are used to detect potential malware among samples of network communication data. A large number of samples of network communication data, such as proxy log data and/or network flows, are received and analyzed by a malware detection system. A number of the samples are associated with known malware, while other unlabeled samples are either benign or may be associated with unknown malware. An inverse imbalance subspace search may be performed, in which the sample sets are divided into subsets based on random feature thresholds, and each subset is evaluated based on the ratio of known malware samples to unlabeled samples. Unlabeled samples within subsets having high malware sample ratios may be identified, aggregated, and processed as potential malware.

17 Claims, 7 Drawing Sheets

(56) References Cited

U.S. PATENT DOCUMENTS

| | | | |
|---|---|---|---|
| 9,838,407 B1* | 12/2017 | Oprea | H04L 63/1416 |
| 9,998,484 B1* | 6/2018 | Buyukkayhan | G06F 21/567 |
| 10,015,192 B1* | 7/2018 | Stiborek | H04L 63/1416 |
| 10,097,573 B1* | 10/2018 | Aziz | H04L 63/145 |
| 10,122,742 B1* | 11/2018 | Oprea | G06F 16/285 |
| 10,187,401 B2* | 1/2019 | Machlica | H04L 67/02 |
| 10,419,449 B1* | 9/2019 | Agranonik | H04L 63/1441 |
| 10,511,614 B1* | 12/2019 | Aziz | H04L 63/1416 |
| 10,721,244 B2* | 7/2020 | Chiba | G06F 21/55 |
| 2006/0068755 A1* | 3/2006 | Shraim | H04M 15/47 |
| | | | 455/410 |
| 2007/0192853 A1* | 8/2007 | Shraim | G06Q 10/107 |
| | | | 726/22 |
| 2007/0192863 A1* | 8/2007 | Kapoor | H04L 67/10 |
| | | | 726/23 |
| 2007/0299777 A1* | 12/2007 | Shraim | H04L 51/212 |
| | | | 705/51 |
| 2008/0244748 A1* | 10/2008 | Neystadt | H04L 63/308 |
| | | | 726/25 |
| 2010/0235915 A1* | 9/2010 | Memon | H04L 63/145 |
| | | | 709/224 |
| 2011/0283361 A1* | 11/2011 | Perdisci | G06F 21/56 |
| | | | 726/24 |
| 2012/0240185 A1* | 9/2012 | Kapoor | H04L 41/0866 |
| | | | 726/1 |
| 2013/0191915 A1* | 7/2013 | Antonakakis | G06F 21/566 |
| | | | 726/23 |
| 2014/0047544 A1* | 2/2014 | Jakobsson | G06F 21/55 |
| | | | 726/23 |
| 2014/0201208 A1* | 7/2014 | Satish | G06F 21/564 |
| | | | 707/737 |
| 2015/0207855 A1* | 7/2015 | Hanckel | H04L 41/069 |
| | | | 709/201 |
| 2015/0244733 A1* | 8/2015 | Mohaisen | G06F 21/561 |
| | | | 726/23 |
| 2016/0099967 A1* | 4/2016 | Stemm | G06F 21/55 |
| | | | 726/1 |
| 2016/0142426 A1* | 5/2016 | Bird | H04L 63/145 |
| | | | 726/23 |
| 2016/0149943 A1* | 5/2016 | Kaloroumakis | H04L 63/1425 |
| | | | 726/23 |
| 2016/0294859 A1* | 10/2016 | Choi | G06F 21/00 |
| 2016/0337380 A1* | 11/2016 | Thomas | H04L 63/1491 |
| 2017/0026390 A1* | 1/2017 | Sofka | H04L 63/1416 |
| 2017/0063892 A1* | 3/2017 | Bartos | H04L 63/1425 |
| 2017/0063893 A1* | 3/2017 | Franc | G06F 21/53 |
| 2017/0085588 A1 | 3/2017 | Laidlaw et al. | |
| 2017/0118240 A1* | 4/2017 | Devi Reddy | G06N 20/00 |
| 2017/0126709 A1* | 5/2017 | Baradaran | H04L 63/1441 |
| 2017/0134404 A1* | 5/2017 | Machlica | H04L 63/1416 |
| 2017/0149810 A1* | 5/2017 | Keshet | H04L 63/145 |
| 2017/0163504 A1* | 6/2017 | Tofts | H04L 43/028 |
| 2017/0316342 A1* | 11/2017 | Franc | G06N 20/10 |
| 2018/0063168 A1* | 3/2018 | Sofka | G06N 3/044 |
| 2018/0183827 A1* | 6/2018 | Zorlular | H04L 63/1416 |
| 2018/0219888 A1* | 8/2018 | Apostolopoulos | H04L 63/1425 |
| 2019/0020671 A1* | 1/2019 | Komárek | G06F 21/552 |
| 2019/0058718 A1* | 2/2019 | Pangeni | H04L 63/1425 |
| 2019/0188212 A1* | 6/2019 | Miller | H04L 63/145 |
| 2019/0260775 A1* | 8/2019 | Bartos | G06F 21/564 |
| 2019/0385057 A1* | 12/2019 | Litichever | H04L 63/14 |
| 2020/0044927 A1* | 2/2020 | Apostolopoulos | H04L 67/561 |
| 2020/0296115 A1* | 9/2020 | Provos | H04L 43/0876 |
| 2021/0027503 A1* | 1/2021 | Kumaresan | G06F 16/26 |
| 2021/0097179 A1* | 4/2021 | Kovác | G06F 16/285 |
| 2021/0099468 A1* | 4/2021 | Cabe | G06F 21/53 |
| 2022/0021655 A1* | 1/2022 | Ramaswamy | H04L 63/1491 |
| 2022/0131835 A1* | 4/2022 | Fenton | H04L 63/1425 |

OTHER PUBLICATIONS

Oak, Rajvardhan et al., "Malware Detection on Highly Imbalanced Data Through Sequence Modeling", ACM digital library, Nov. 15, 2019, pp. 1-12.

* cited by examiner

[Date and Time] [Client IP Address] [Client Port]
[Cache Hit Code] [HTTP Method]
[Request URL] [Server Port] [Query String Parameters]
[Content Type]
[Referrer Domain] [Referrer URL]
[User Agent [Client OS] [Client Agent Software] [Layout Engine] [Client ID]]
[Filter Result Field] [HTTP Service]

FIG. 2A 2020-10-01 09:34:41 225 1XX.115.109.XX 200 TCP_NC_MISS 332 533 GET http [sitename].[domain_name.com] 68.15.172.76 80 /main/layouts/images/primary_menu.jpg - [URL]?param1=&key=&id=123 - DIRECT domainname.com image/gif "Mozilla/5.0 (Windows; U; Windows NT 6.0; de; rv:1.9.2.3) Gecko/20100401 Firefox/3.6.3 GTB7.1 ( .NET CLR 3.5.30729)" OBSERVED "Domain Title" – 1XX.127.25.XX SG-HTTP-Service

FIG. 2B

Prioritized Malware Risk Table

| Unlabeled Sample ID | Malware Risk Score | Domain | Similar Samples |
|---|---|---|---|
| Unlabeled Sample ID1 | 73 | Domain Name 1 | IDs of Malware Samples |
| Unlabeled Sample ID2 | 69 | Domain Name 2 | IDs of Malware Samples |
| Unlabeled Sample ID3 | 65 | Domain Name 3 | IDs of Malware Samples |
| Unlabeled Sample ID4 | 52 | Domain Name 4 | IDs of Malware Samples |
| ... | ... | ... | ... |

MALWARE DETECTION USING INVERSE IMBALANCE SUBSPACE SEARCHING

TECHNICAL FIELD

The present disclosure generally relates to computer security and detection of malicious or harmful software. In particular, the present disclosure relates to detecting malware previously unidentified malware types and sources based on analyses of sets of network communication data including known malware samples and unlabeled samples.

BACKGROUND

Machine-learning based threat detection systems for detecting potential malware are generally trained in a supervised way, requiring a labeled dataset of network communication data (e.g., proxy log samples or network flows). In conventional systems, it is a common practice to provide a fully labeled data by annotating the known malware samples among the training samples based on available threat intelligence, while the rest of the unlabeled samples are assumed to be benign. When such techniques are used to train machine-learning classification models, these models can detect the known malware samples and their variations. However, such models often fail to detect new unknown malware types and/or sources, especially those which were wrongly marked as benign during the training phase.

Additionally, to identify new unknown malware types and sources, threat intelligence data must be updated based external and/or internal data sources. External sources include security reports, domain blacklists, threat feeds, results of sandboxing analysis, and the like, while internal sources may include stored samples of network communications data (e.g., proxy log samples) along with the current state of the threat intelligence. Identifying new malware types using internal sources may require a sophisticated system capable of processing a high volume of data and producing only a list of new potential malware threats that can be examined further by additional malware analysis components and/or teams of human analysts. However, manual investigation by human analysts may be costly and time-consuming, and thus it is important for automated systems to select and prioritize samples having the greatest likelihood of being associated with new unknown malware types and sources.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A and 2B show examples of proxy log entry samples, in accordance with one or more techniques described herein.

FIG. 6 is an example table illustrating the output of repeated runs of an inverse imbalance subspace search on a sample set, in accordance one or more techniques described herein.

DESCRIPTION OF EXAMPLE EMBODIMENTS

Overview

Figure 1:
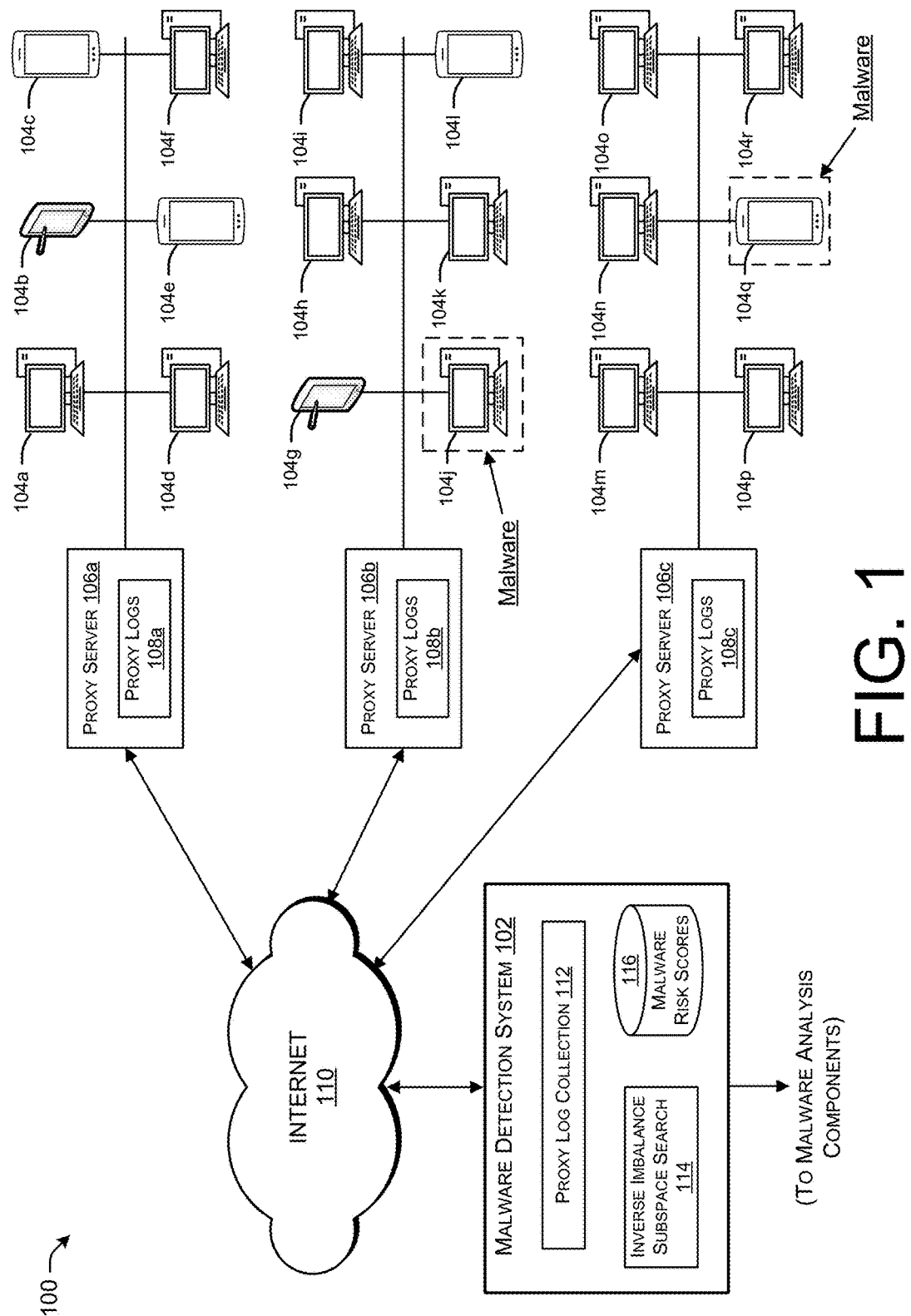
FIG. 1 illustrates a computing environment including a malware detection system configured to analyze proxy log samples received from via proxy servers, in accordance with one or more techniques described herein.

This disclosure describes techniques for detecting potential malware within samples of network communication records, such as proxy log entries or network flows. In some examples, a malware detection system analyzes an initial set of samples in which some samples are associated with known malware issues or sources, and other samples (referred as "unlabeled" samples) are not associated with known malware and thus may be benign or are potentially associated with previously unknown malware. The malware detection system may use an inverse imbalance subspace searching technique, described in detail herein, to determine which of the unlabeled samples are potentially associated with unknown malware issues or sources, so that those unlabeled samples and/or their source domains can be further analyzed by additional malware detection components.

As used herein, a "sample" may refer to data representing or associated with network communications. For example, a proxy server logs may include samples of proxy log entries that represent network requests (e.g., web/Internet requests) transmitted by users and/or applications via client devices, and responses transmitted from web servers. Additionally, network flow samples may represent a packet flow (or network flow) as a sequence of packets from a source system to a destination system over a packet-switching network. A network flow sample may include the packets within a particular transport connection or stream.

Samples such as proxy log entries, network flows, and other network communication data records may consist of various "features" or characteristics. For instance, within a proxy log entry or network flow, the features of the sample may include the URL of the network request, the content type, the user agent, the protocol, the request time, the client/server port number, etc. A malware detection system may parse or analyze samples, using different techniques dependent on the sample type, to determine the features values for the samples. As discussed in more detail below, the malware detection system also may determine values for additional features that are derived from the basic sample features. For instance, if a proxy log sample feature is the request URL, examples of derived features may include the length of the URL or the number of forward slashes "/" in the URL. As discussed below, certain derived features may be useful is classifying samples as potential malware.

In various examples, a malware detection system may perform inverse imbalance subspace searching techniques on a set of samples, such as proxy log entries or network flows, to identify potential malware among the unlabeled samples. As described below, the inverse imbalance subspace search may include a multi-step process, which can be performed recursively and/or repeatedly, to identify unlabeled samples that have certain similar feature values (e.g., feature similarities or commonalities) to known malware samples. During an inverse imbalance subspace search, the malware detection system may repeatedly divide a set of samples into two (or more) subsets based on one or more features and thresholds associated with the features. For instance, for an initial set of samples received from proxy servers or other network devices, the malware detection system initially may select a first feature and first feature threshold value to subdivide the sample set. During the subdividing operation, each sample that has a value for the first feature less than the threshold value may be classified into a first subset, and each sample having a value greater than the threshold value may be classified into a second subset.

During an inverse imbalance subspace searching process, the malware detection system may repeatedly subdivide (or split) sets of samples into successively smaller subsets, and may evaluate each resulting subset to determine when a stopping condition has occurred that indicates that the subset should no longer be split. As described below, the stopping conditions for further of splitting of a sample subset may be based on a comparison of the number of known malware samples to the number of unlabeled samples in the subset. As subsets of samples are successive split into smaller subsets, the splitting operations may be based on sample features and feature value thresholds. For instance, to split an existing subset of samples into two (or more) smaller subsets, the malware detection system may use a new feature and/or new feature value threshold to classify the subset samples into the smaller subsets. In some cases, the feature and/or new feature value threshold may be determined using random selection techniques, and different features/thresholds may be used for each successive splitting of a subset into smaller subset.

As noted above, the malware detection system may repeatedly split subsets of samples into successively smaller subsets until a stopping condition has been reached for each subset. Various stopping conditions for splitting subsets may be based on the number of known malware samples in the subset and the number of unlabeled samples in the subset. For instance, for each subset generated by a feature-based subdividing (or splitting) of the initial sample set or a subset, the malware detection system may compare (and/or determine a ratio or difference) between the number of the samples in the subset that are associated with known malware, and the number of samples that are not associated with known malware. As an example, if a subset has no known malware samples but consists entirely of unlabeled samples, then the malware detection system may determine a stopping condition because the subset is "pure" and need not be split any further. Additionally, the malware detection system may determine that the pure subset cannot be used to identify any feature similarities between the unlabeled samples in the subset and any known malware, because the subset includes no known malware samples. Therefore, the malware detection system determines a stopping condition in which it does not record any data indicating that the unlabeled samples in the subset have any feature similarities with known malware.

Similarly, for subsets consisting entirely of known malware samples (e.g., having no unlabeled samples), the malware detection system determines another stopping condition in which the subset need not be split into further subsets. In such cases, the malware detection system also may determine that because there are no unlabeled samples in the subset, the subset cannot be used to identify any feature similarities between unlabeled samples and known malware. Therefore, the malware detection system determines another stopping condition in this example in which it does not record any data indicating any feature similarities between unlabeled samples and known malware.

When a subset includes at least one known malware sample and at least one unlabeled sample, the malware detection system may compare the number of known malware samples to unlabeled samples to determine whether a stopping condition has been reached. For instance, the malware detection system may calculate a difference and/or a ratio between known malware samples and the unlabeled samples in the subset, and compare the difference or ratio to a threshold to determine if a stopping condition has been reached. In some examples, when the ratio of known malware samples in a subset exceeds a threshold (e.g., 50%), then the malware detection system may determine that a stopping condition has occurred, and/or that the unlabeled samples in the subset have some feature similarities with the known malware samples in the subset. Therefore, in this example, the malware detection system may stop the repeated splitting of the subset into further subsets, but may increment a malware risk score for each of the unlabeled samples in the subset to indicate feature similarities with the known malware. As discussed below, the malware risk scores may be persisted and tracked over multiple iterations (or runs) of the inverse imbalance subspace search process, to determine which of the unlabeled samples have the most feature similarities with known malware.

Continuing with the above example, if the ratio of known malware samples in the subset does not exceed the threshold (e.g., 50%), then the malware detection system may determine that the stopping condition has not occurred. In this example the malware detection system may subdivide (or split) the subset again into smaller subsets, and may continue splitting subsets into smaller and smaller subsets until a stopping conditions occurs for each subset. Thus, for each successive split of a subset into smaller subsets, the malware detection system may evaluate each resulting subset to determine the ratio of known malware samples to unlabeled samples, and may determine either to re-split or not to re-split for each of the resulting subsets. Additionally, for any mixed subset (e.g., a subset containing at least one known malware sample and at least one unlabeled sample), when the ratio of known malware samples in the subset exceeds the threshold, the malware detection system may determine not to re-split the subset and also may increment the malware risk scores for each of the unlabeled samples in the mixed subset.

In some implementations, the process described above for inverse imbalance subspace searching may be performed multiple times, each time starting with the same initial set of samples. During each run of an inverse imbalance subspace search process, the initial sample set may be subdivided one or more times as described above until stopping conditions are reached for each subset. However, for different runs the malware detection system may use different features and/or different feature value thresholds, which may be randomly selected for each subset split in each run. Therefore, different runs of the inverse imbalance subspace search process, starting with the same new initial set of samples, may result in different splitting criteria and different subsets. Accordingly, different runs may cause different unlabeled samples to be grouped with known malware samples in the different subsets generated in each run. This may result in different unlabeled samples being identified as having feature similarities with known malware in different runs, and thus the malware risk scores for different unlabeled samples may be incremented in different runs.

As this example illustrates, the malware risk score for a single unlabeled sample may be incremented (or otherwise increased) multiple times, during multiple runs of the inverse imbalance subspace search process. For instance, if the example process described above is run ten times on the same initial sample set, then the malware risk score associated with an unlabeled sample could be any value from zero to ten, assuming a single increment of value one (1) is performed or not performed in each run. As the malware detection system performs many different runs of the process (e.g., hundreds or thousands), the unlabeled samples that are most often classified with known malware samples, based on similarities between their sample feature values, will be assigned the highest malware risk scores.

After executing a number of runs of an inverse imbalance subspace search process as described herein, the malware detection system may select the unlabeled samples having the highest malware risk scores for additional analyses and/or further malware risk assessment. In this example, unlabeled samples having the malware risk scores may represent the highest risk and/or greatest likelihood of being associated with an unknown malware issue or source, based on their similarity in feature values with known malware samples. The malware detection system may select the N samples having the highest malware risk scores and may transmit those samples and/or their associated network domains, to a malware analysis component and/or a risk assessment team for further analysis of the malware risk. In some examples, the malware analysis component may collect data for multiple associated unlabeled samples, such as samples having the same source domain, and may transmit the set of unlabeled samples for further analysis.

As illustrated in the various examples herein, the techniques in this disclosure provide improvements in the detection of malware based on sample sets of network communication data such as proxy logs and/or network flows. Specifically, the techniques described herein include using an inverse imbalance subspace search to detect new types and/or sources (e.g., domains) of previously unidentified malware within unlabeled samples, based on similarities between the feature values of the unlabeled samples and known malware samples. In contrast, conventional machine-learning techniques may assume that unlabeled samples are benign for the purposes of training and testing machine-learning models. Although many of the unlabeled samples in a sample set are benign, some samples may be unknown malware, and thus conventional machine-learning techniques may train and test models to expressly treat previously unidentified malware as benign. The techniques described herein provide improved accuracy and detection capabilities by comparing and evaluating unlabeled samples as potential malware, rather than assuming that unlabeled samples are benign, and identifying the closest unlabeled samples in terms of feature similarity as potential new and unknown malware.

In an example of the present disclosure, a method includes receiving, by a computer system, network log data associated with a plurality of network communications, and determining a first feature associated with the network log data, as well as a first threshold associated with the first feature. In this example, the method further includes classifying, by the computer system, the plurality of network communications into two or more subsets based on the first feature and the first threshold, wherein the two or more subsets includes at least a first subset, determining, by the computer system, a first number of the plurality of network communications in the first subset that are associated with at least one known malware source, and determining, by the computer system, a second number of the plurality of network communications in the first subset that are not associated with the at least one known malware source. Additionally, the method includes detecting, by the computer system, a malware risk associated with a first network communication in the first subset, wherein the first network communication is not associated with the at least one known malware source, and wherein detecting the malware risk is based on the first number and the second number. The method in this example also includes initiating, by the computer system, a malware analysis of a network domain associated with the first network communication, based at least in part on detecting the malware risk associated with the first network communication.

In another example of the present disclosure, a computer server includes one or more processors and one or more non-transitory computer-readable media storing instructions that, when executed by the one or more processors, cause the one or more processors to perform various operations. The operations in this example include receiving a plurality of proxy log entries, determining a first feature associated with the plurality of proxy log entries, and a first threshold associated with the first feature, and classifying the plurality of proxy log entries into at least a first subset and a second subset, based on the first feature and the first threshold. The operations performed in this example further include determining a first number of the proxy log entries in the first subset that are associated with known malware, and determining a second number of the proxy log entries in the first subset that are not associated with the known malware. Additionally, the operations in this example include determining a malware risk associated with a first proxy log entry in the first subset, wherein the first proxy log entry is not associated with the known malware, and wherein determining the malware risk is based on comparing the first number and the second number, and performing a malware analysis associated with a network domain, based at least in part on determining the malware risk associated with the first proxy log entry.

In yet another example of the present disclosure, a non-transitory computer-readable medium stores processor-executable instructions that, when executed by one or more processors, cause the one or more processors to perform various operations. In this example, the operations include receiving proxy log data comprising data representing a plurality of proxy log entries, determining a first feature associated with the proxy log data, and a first threshold associated with the first feature, and classifying the plurality of proxy log entries into at least a first subset and a second subset, based on the first feature and the first threshold. The operations in this example further include determining a first number of the proxy log entries in the first subset that are associated with known malware, determining a second number of the proxy log entries in the first subset that are not associated with the known malware, and determining a malware risk associated with a first proxy log entry in the first subset, wherein the first proxy log entry is not associated with the known malware, and wherein determining the malware risk is based on comparing the first number and the second number. The operations in this example also include performing a malware analysis associated with the first proxy log entry, based at least in part on determining the malware risk associated with the first proxy log entry.

Additionally, the techniques described in this disclosure may be implemented and performed as systems, methods, and/or computer-program products tangibly embodied in a non-transitory computer-readable storage medium, etc.

Example Embodiments

This disclosure describes techniques for using inverse imbalance subspace search techniques to detect malware within a set of data representing network communications. As described herein, an initial set of network communication data records (or "samples") such as proxy log samples, network flow samples, and the like, may be received and analyzed by malware detection system. The initial set of samples may be a mixed sample set that includes at least one sample associated known with known malware issues or sources, and at least one unlabeled sample which either may be benign or may be associated with previously unknown malware issues and/or sources. In various examples, the malware detection system may perform one or more runs of an inverse imbalance subspace search, during which sample sets are repeatedly divided into smaller subsets based on feature and each subset is evaluated to determine if a stopping condition has occurred for the subset. The stopping conditions for a subset may be based on the relative numbers of known malware samples and unlabeled samples within the subset, and malware risk scores may be assigned to unlabeled samples in subsets having a relatively high number of known malware samples indicating feature similarity with the known malware samples. Multiple runs of inverse imbalance subspace search processed may be performed for the same initial sample set, the unlabeled samples having the highest aggregated malware risk scores may be forwarded for further analysis by as potential malware.

FIG. 1 shows a computing environment 100 including a malware detection system 102 configured to analyze network communication data records associated with client devices 104, received via proxy servers 106, and to detect potential new and unknown malware issues and sources based on the network communication data records. As shown in this example, the network communication records received and analyzed by the malware detection system 102 may include proxy log entries collected by proxy servers 106 and stored locally in proxy logs 108 prior to transmission to the malware detection system 102. However, in other examples, the malware detection system 102 may use similar or identical techniques to analyze network flows and/or any other type of network communication data records having associated features/feature values.

The malware detection system 102 may include one or more virtual and/or physical computer servers, each of which may include a network interface (e.g., one or more network interface cards), a processor, and memory storing programmatic instructions to perform the operations described herein. For example, the memory of the malware detection system 102 may include a number of software modules and/or engines, including a proxy log collection component 112, an inverse imbalance subspace search component 114, and a malware risk score data store 116, and the processor(s) of the malware detection system 102 may be configured to execute instructions stored on each of these modules or engines. For instance, the proxy log collection component 112 may be configured to retrieve (or collect) proxy logs 108 from various proxy servers 106 within a wide-area network, the inverse imbalance subspace search component 114 may be configured to perform a number of inverse imbalance subspace search processes based on the received proxy log data, and the data store 116 may be configured to store and maintain malware risk scores and/or related data associated with individual samples (e.g., proxy log entries) and/or groups of samples based on the inverse imbalance subspace search processes. Network interfaces (not shown) within the malware detection system 102, client devices 104, and/or proxy servers 106 may provide connectivity to the Internet 110, through which the client devices 104 and/or proxy servers 106 may transmit samples (e.g., proxy log entries) from the proxy logs 108 to the malware detection system 102.

In some examples, the proxy log samples received by the malware detection system 102 may be pre-labeled as being associated with known malware. For instance, metadata or other data associated with a received sample may include an indicator that the sample corresponds to a request or response for a known malware executable or other malware file, from a known malware user, application, or domain, etc. In such cases, the malware detection system 102 may store the received proxy log samples and the corresponding known malware labels in storage for use in performing the inverse imbalance subspace search processes described in more detail below.

Additionally or alternatively, the malware detection system 102 may be configured to determine which received samples are associated with known malware and to label those samples accordingly. For instance, the malware detection system 102 may retrieve data relating to sets of previously known malware (e.g., listings of malicious executables or other files, listings of known malicious domains, servers, applications, users, listings of known exploitable malware issues, etc.), and may compare the received samples from the proxy logs 108 to the known malware issues. In some instances, the malware detection system also may receive network traffic path data from the proxy logs 108, and may be configured to identify portions of network traffic/path associated with particular files, executables, source servers, users or applications, and the like, to detect samples associated with known malware.

Although the various components (e.g., modules, engines, and data stores) described herein within the malware detection system 102 may be software-based components stored in a memory, the various components described herein also may be embodied by hardware, or a combination of hardware and software. For example, each component 112-116 and/or other functionality associated with the malware detection system 102 may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a component by processor can also refer to logic-based processing by the component that may be initiated directly or indirectly by a processor to complete a process. Alternatively or additionally, each component within the malware detection system 102 may include separate processing and/or memory hardware that includes instructions executable for implementing the operations of the component. Thus, although depicted as a single computing system in this example, the various components of the malware detection system 102 and/or functionality described herein associated with the malware detection system 102 may be performed on separate computing devices or servers using separate hardware and software infrastructures.

As shown in this example, the malware detection system 102 is connected to a number of proxy servers 106 via the Internet 110. Each proxy server 106 may act as an intermediary for requests coming from a network with which the proxy server 106 is associated. Additionally, each proxy server 106 may store proxy logs 108 of Internet-based communication records to/from client devices 104 that are established via that proxy server 106. In some examples, proxy logs 108 each may include a specific proxy log for each specific client device 104 in the network with which its respective proxy server 106 is associated. Accordingly, each set of proxy logs 108 may each be referred individually or collectively as a proxy log or set of proxy logs.

Each proxy server 106 in this example may function as intermediary for one or more networks or subnetworks including a number of separate client devices 104. For instance, in this example, proxy server 106*a* is an intermediary network device for client devices 104*a*-104*f*, proxy server 106*b* is an intermediary network device for client devices 104*g*-104*l*, and proxy server 106*c* is an intermediary network device for client devices 104*m*-104*r*. The client devices 104, which may include any virtual or physical network nodes, each may be associated with one or more users and may operation one or more client applications. It should also be understood that the arrangement depicted in FIG. 1, in which three proxy servers 106 act as intermediaries for six client devices each, is illustrative only and that any number of proxy servers 106 and any number of associated client devices 104 may be used in other implementations. That is, in other implementations the computing environment 100 may be scaled to any desirable size, and the various techniques described herein may provide further improvements for malware detection as the number of proxy servers 106 and/or client devices 104 increases.

In this example, client devices 104 are represented as various computing devices, including desktop computers, smartphones, tablet computers, and the like. However, it should be understood that client devices 104 may comprise any type of computing device through which a user is able to interact with other devices via a communication network, including but not limited to computer servers, smartphones, tablets, laptops, vehicle-based devices, personal computing devices, wearable devices, Internet-of-Things (IoT) devices, etc. Each client device 104 may include one or more network interfaces and/or other network equipment to enable the client device 104 to connect to the Internet 110 via a proxy server 106.

Additionally, as shown in FIG. 1 for illustrative purposes, malware resides and is executed on client device 104*j* and client device 104*q*. In some examples, the malware residing on client devices 104*j* and 104*q* in this example may include executable files and/or programs (e.g., executables) that causes a computer/processor to execute instructions. Various types of malware may be stored in a machine language, interpreted language, intermediate language, script language or any other language now known or hereinafter developed that causes a computer/processor to execute instructions. In some examples, the malware stored on client devices 104*j* and 104*q* may execute causing harmful operations to occur on those client devices. Additionally or alternatively, the malware executing on client devices 104*j* and 104*q* may attempt to propagate to other client devices 104, such as clients within the same LAN or subnetwork, and/or may initiate communications with a malicious external server via the Internet 110. Accordingly, the proxy log entries stored in proxy logs 108 that are associated with malware may include communications between client devices 104 to/from external devices or systems, as well as communications between client devices 104 to/from other client devices 104 or any other network node within the same network or subnet. Additionally it should be understood that although only client devices 104*j* and 104*q* are shown as hosting malware in this example, in other examples any combination of client devices 104, servers, and/or other network devices may also be infected by malware.

FIGS. 2A and 2B provide two examples of a proxy log entry that may illustrate various techniques of the inverse imbalance subspace search processes described herein. In this example, FIG. 2A depicts a generic description of certain fields that may be included in a proxy log entry, and FIG. 2B provides sample data for an example proxy log entry. Thus, either FIG. 2A or FIG. 2B may be representative of a proxy log entry stored in a proxy log 108, based on a communication between a client device 104 and other computing system, via a proxy server 106. It should be understood that the proxy log entries depicted in these examples are illustrative only, and that any other proxy log format, network flow format, or any other set of feature values that represent a network communication may be used as a proxy log entry in other examples. As shown in FIG. 2A, in some examples proxy log entries may include one or more of a date and time field, a client IP address field, a cache hit code field, an HTTP method field, a request URL field, a server port field, a client port field, one or more query string parameters, a content type field, a referrer domain field, a referrer URL field, one or more user agent fields identifying a client operating system, client agent software, a client layout engine, and a client device identifier, a filter result field, and/or an HTTP service field. FIG. 2B shows an example of a proxy log entry including sample data for a similar set of fields.

As described in the various examples below, the malware detection system 102 may define various features based on the characteristics of the any proxy log entry fields and/or combinations of fields. For instance, various features described herein may correspond to proxy log entry fields (e.g., the client port number, the server port number, the content MIME type, the request time or date, etc.) that can be parsed or extracted directly from a proxy log entry such as the example entry shown in FIG. 2B. Additionally, other features used by the malware detection system 102 may be calculated or derived based on the proxy log entry fields, such as the day of the week, the popularity of the domain, the length of the URL, protocol, the HTTP status, whether or not the URL is encrypted, the number of special characters such as "&" or "/" within the URL, the query parameters, and/or the referrer fields, etc. It should be understood that these examples and any other examples of features discussed are illustrative only and non-limiting, and that the techniques described herein may be applied for any feature characteristic of a proxy log entry or any other record representing a network communication.

Figure 3:
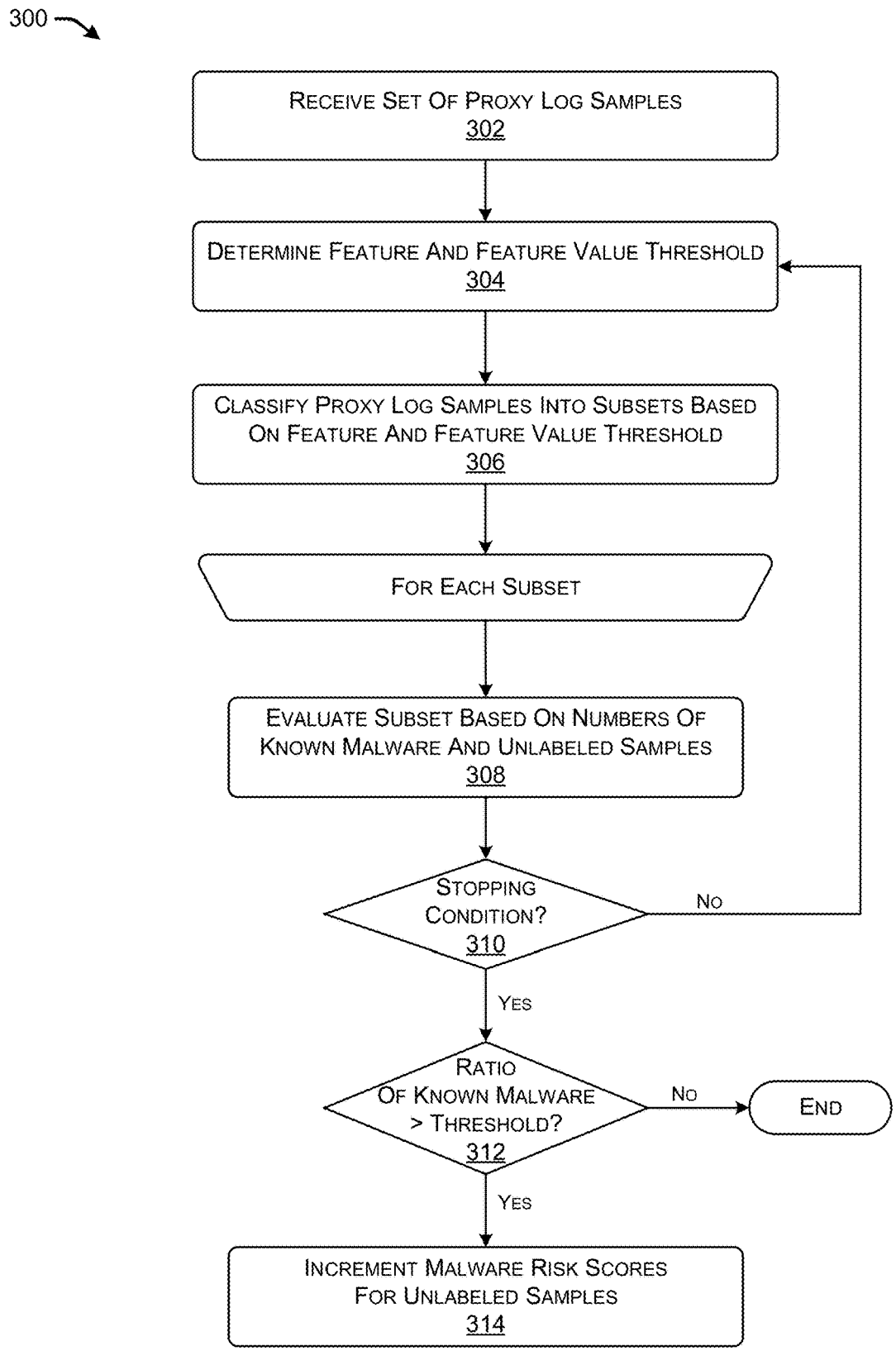
FIG. 3 illustrates an example process of executing a run of an inverse imbalance subspace search on a sample set, in accordance one or more techniques described herein.

FIG. 3 illustrates a flow diagram of an example process 300 for executing an inverse imbalance subspace search process for detecting previously unknown malware, based on a set of proxy log samples (or entries) representing network communication records. As described below, the operations of process 300 may be performed by a malware detection system 102 including components 112-116, based on proxy log data 108 received from one or more proxy servers 106, as described above in reference to FIG. 1.

However, it should be understood that the operations described in process 300 are not limited to the computing environment 100 described in FIG. 1, but may performed by any combination of the components, servers, and/or computing devices described herein.

As described in more detail below, process 300 may represent a single iteration (or run) of an inverse imbalance subspace search process. A single run of the inverse imbalance subspace search process 300 may include subdividing (or splitting) an initial set of samples into multiple subsets, and continuing to split each subset repeatedly until a stopping condition is satisfied for that subset. When a stopping condition is satisfied for a subset, the malware risk scores associated with certain samples in the subset may be incremented. As described below in reference to FIGS. 5-6, an inverse imbalance subspace search process 300 may be executed multiple times on the same initial set of samples, and different combinations of certain samples may be incremented in different runs. Accordingly, FIGS. 3-4 describe a single run of the inverse imbalance subspace search process 300, while FIGS. 5-6 describe multiple runs of a similar or identical process that may be performed with aggregated results based on the same initial set of proxy log samples.

At operation 302, the malware detection system 102 may receive a set of proxy log samples from one or more proxy servers 106. As noted above, although this example refers to an initial set of proxy log samples (e.g., entries within a proxy log 108), process 300 may be performed based on proxy logs, network flow data, and/or any other data representing a plurality of network communications. Each sample may represent a single network communication (e.g., request or response) to or from a client device 104 and other computing device, such as another computing device within the network or an external server. The samples received in operation 302 may include any collection of feature values (and/or other data field values or characteristics) associated with the network communication, such as the example proxy log entry shown in FIG. 2B.

In some cases, it may be assumed that the initial set of proxy log samples received in operation 302 is a "mixed" sample set, that is, a sample set containing at least one known malware sample and at least one unlabeled sample. Additionally, as discussed above, in some examples initial set of proxy log samples received at operation 302 may include proxy log data in which each sample is either labeled (using metadata or other associated data) as known malware, or is unlabeled indicating that the sample is benign or is associated with unknown/previously undetected malware. As described below, the inverse imbalance subspace search process 300 may repeatedly subdivide the mixed set of samples received at operation 302 into subsets in order to determine similarities in the feature values between samples labeled as known malware and unlabeled samples.

At operation 304, the malware detection system 102 may determine a feature and a feature threshold value associated with the determined feature. As described below, the combination of the feature and feature threshold value may be used to split the initial set of proxy log samples received at operation 302 into subsets. As used herein, a feature may refer to any characteristic or attribute associated with proxy log samples. Feature values, in contrast, may refer to the value of characteristic or attribute for a particular proxy log sample. As an example, if a first feature is URL length, then different possible features values for URL length feature may be integers (e.g., 18, 25, 34, 51, etc.) for different proxy log samples. For certain features, the feature values for a proxy log sample can be extracted or parsed directly from the proxy log sample itself, while for other features the malware detection system 102 may perform additional operations or calculations to determine a feature value based on the proxy log sample.

The malware detection system 102 may select as a feature in operation 304, by way of example, the time of day of the proxy log sample, the day of the week of the proxy log sample, the length (e.g., number of characters) of the request URL, the number of "&" characters in the URL, the number of "/" characters in the URL, the number of "?" characters in the URL, the number of "=" characters in the URL, length of the user agent field(s) in the proxy log sample, the client port number, the server port number, the number of "/" characters in the referrer address, the content type, lower case or upper case ratio of the URL, etc. Additionally or alternatively, malware detection system 102 may retrieve and select as features data from external data sources. For instance, domain popularity data retrieved from an external source (e.g., an Alexa rank), domain registrar data from an external source (e.g., a WHOIS database), a domain reputation metric from an external source, autonomous system data based on the IP address, and the like, also may be used as features. In various implementations, such external data features may be used in addition to or instead of the other features described herein that are directly extractable from proxy logs. It should be understood that this listing of features is non-limiting, and that any characteristic of a proxy log sample, or any combination of characteristics, can be used as a feature by the malware detection system 102.

In some examples, the malware detection system 102 may use random selection techniques to determine the feature and/or feature value threshold in operation 304. For instance, the malware detection system 102 may maintain a list of features for use in inverse imbalance subspace searches of proxy log sample sets, and in operation 304 may randomly select a feature from the list. The malware detection system 102 also may determine a feature value threshold in operation 304 that is compatible with the selected feature. The type and particular value determined for a feature value threshold may be based on the type of selected feature and the possible values (e.g., range of values or discreet values) for the selected feature. In some examples, the malware detection system 102 may randomly select a value within a range, or may randomly select one or more of the possible discreet values to serve as the feature value threshold.

At operation 306, the malware detection system 102 may classify the proxy log samples in the initial set of samples, into subsets based on the feature and feature threshold value determined in operation 304. To classify the samples, the malware detection system 102 may determine a value of the feature for each sample, and may compare the values to the threshold to determine which samples are classified in which subsets.

For certain features, the possible values that a sample may have for the feature may include any of a range of values. This may apply to time-based features and/or numerical features (e.g., request time, hour, day of the week, client or server ports, field lengths, number of characters, domain popularity, etc.). For these examples, the malware detection system 102 may maintain a range of possible values for the feature, and may randomly select a threshold value from the range in operation 304. For instance, if the feature selected is a URL length feature, then the malware detection system 102 may randomly select a number value between predefined minimum and maximum URL lengths (e.g., between 5 and 100 characters) as the threshold value. In these examples, the classification of the proxy log samples in operation 306 may including classifying samples into different subsets based on whether or not their feature values exceed the threshold value.

In contrast, for other features the possible values that a sample may have for the feature may include a set of discrete values rather than a range. This may apply to features such as the content type, user agent fields, and the like. In such examples, the malware detection system 102 may randomly select one or more of the possible discrete values to serve as a feature value threshold in operation 304, and the proxy log samples may be classified into subsets in operation 306 based on whether or not their feature values match one of the selected discrete values of the threshold. For instance, if the feature selected is a user agent client OS feature, then in operation 304 the malware detection system 102 may randomly select one or more possible client operating systems from a list (e.g., all WINDOWS OS's) to serve as the feature value threshold. Then, in operation 306, the malware detection system 102 may classify all proxy log samples having any WINDOWS user agent client OS into a first subset, and all proxy log samples not having a WINDOWS user agent client OS into a second subset. In other examples, for features that have categorical values rather than a range of possible numeric values, malware detection system 102 may first convert the categorical variables into numeric values, using an encoding scheme such as one-hot encoding, ordinal encoding, frequency encoding, hashing, etc., after which the malware detection system 102 may randomly select from the resulting numeric values.

Additionally, although some examples herein describe splitting the initial proxy log sample set into two subsets based on a feature and feature value threshold (and also splitting subsequent subsets into two smaller subsets), in other examples the malware detection system 102 may split one sample set into three or more subsets. For instance, when multiple different features and/or feature threshold values are defined in operation 304, then in operation 306 the malware detection system 102 may classify the sample set into potentially more than two subsets. As an example, for a selected feature having a range of possible values, the malware detection system 102 may determine two different thresholds in operation 304, and then may use the two different thresholds to split the sample set into three subsets. As another example, the malware detection system 102 may select two different features in operation 304 and a threshold for each feature, and then may use the two different features and thresholds to split the sample set into four subsets (corresponding to the four different feature-threshold combinations).

As indicated in FIG. 3, after splitting the set of proxy log samples into two (or more) subsets in operation 306, operations 308-314 in the process 300 may be performed separately for each of the subsets. At operation 308, a subset is evaluated based on the number of known malware samples and the number of unlabeled samples in the subset. As noted above, each sample in the initial set of proxy log samples may be assigned a labeled indicating that the sample is associated with a known malware source or issue (e.g., a known malware executable, application, user, domain, etc.), or alternatively may be assigned as unlabeled indicating either that the sample is benign or is associated with an unknown and previously undetected malware source or issue. In some examples, for each subset following a split, the malware detection system 102 may calculate a malware ratio of the subset (e.g., the number of known malware samples over the number of unlabeled samples), or the difference (e.g., the number of known malware samples minus the number of unlabeled samples).

At operation 310, the malware detection system 102 may determine whether a stopping condition is present for the subset based on the evaluation of the known malware numbers/ratio in operation 308. A stopping condition refers to a rules-based determination by the malware detection system 102 to stop the repeated splitting of subset. As discussed above, the malware detection system 102 may evaluate multiple different stopping conditions in various examples. For instance, if the subset contains only unlabeled samples or contains only known malware samples, then the malware detection system 102 determines that a stopping condition has occurred, and the subset need not be split again (310: Yes). In these instances, the malware detection system 102 may determine that the homogeneous subset (e.g., containing either all malware or all unlabeled samples) would not be useful in identifying feature similarities between any unlabeled samples and the known malware samples, and thus further splitting of the subset does not serve any purpose.

In other examples, if the subset is mixed subset of samples (e.g., containing at least one known malware sample and at least one unlabeled sample), the malware detection system 102 may determine whether a stopping condition has occurred based on the known malware ratio and/or the difference between known malware samples and unlabeled samples. In some instances, if the number of known malware samples in the subset is greater than 50% (e.g., a malware ratio of 1-to-1 or higher), then the malware detection system 102 also may determine that a stopping condition has occurred (310: Yes). Unlike the previous examples, in this case the malware detection system 102 may determine that the mixed subset having a sufficiently high known malware sample count, difference, or ratio may be used to identify feature similarities between the unlabeled samples in the subset and the known malware samples in the subset, and thus no further splitting of the subset is necessary.

As depicted in FIG. 3, when the malware detection system 102 determines that a stopping condition has not occurred for a subset (310: No), then the process may return to operation 304 for the subset. At operation 304, a new feature and/or feature value threshold may be selected, and at operation 306 the subset may be split again into two (or more) smaller subsets using similar or identical techniques to those described above.

However, when the malware detection system 102 determines that a stopping condition has occurred for a subset (310: Yes), then at operation 312 the malware detection system 102 determines whether the stopping condition is one in which the subset may be used to identify feature similarities between unlabeled samples and known malware samples. As shown in this example, the malware detection system 102 may determine at operation 312 whether the ratio of known malware samples in the subset exceeds a malware ratio threshold. In some cases, a malware ratio threshold of 1-to-1 may be used (indicating that the number of known malware samples in the subset meets or exceeds the number of unlabeled samples in the subset), although in other cases any other malware-to-unlabeled ratio threshold may be applied. Additionally, in other examples operation 312 may include other types of threshold evaluations, such as comparing the raw number of known malware samples in the subset to a threshold, or comparing the difference between the number of known malware samples and unlabeled samples to a threshold.

Accordingly, for the stopping conditions described above based on a homogeneous subset (e.g., when the subset contains all known malware samples or all unlabeled samples), the malware detection system 102 may determine that the subset also does not satisfy the malware ratio requirement of operation 312 (312: No), in which case process 300 may terminate for the particular subset. However, for mixed subsets having a known malware that exceeds the threshold (312: Yes), or where the mixed subset otherwise satisfies the conditions for incrementing the malware risk scores of the unlabeled samples, process 300 may proceed to operation 314 for the subset.

At operation 314, when a mixed subset has higher ratio of known malware samples than the predetermined threshold (312: Yes), the malware detection system 102 may increment the malware risk scores associated with each of the unlabeled samples in the subset. As noted above, when an initial set of proxy log samples is received, the malware detection system 102 may create and initialize (e.g., set to zero) an assigned a malware risk score for each sample. At operation 314, the malware detection system 102 may increment (or otherwise increase) the malware risk score for any unlabeled samples subset (e.g., a mixed subset having a known malware ratio exceeding the threshold). The incrementing of the malware risk scores may represent that the associated unlabeled samples have certain similarities in their feature values with known malware samples. Although in this example, the malware risk scores associated with the unlabeled samples in the subset may be incremented (e.g., increased by a value of one), in other examples various different techniques may be used to update the malware risk scores of unlabeled samples. In some examples, the amount by which a malware risk score is increased may be based on the number of known malware samples and/or the malware ratio within the subset. For instance, the malware detection system 102 may increase the malware risk scores by a greater amount when a larger number of known malware samples are in the subset and/or when the malware ratio is higher, and may increase the malware risk scores by a lesser amount when fewer known malware samples are in the subset and/or when the malware ratio is lower. Additionally or alternatively, the malware detection system 102 may decrease a malware risk score for an unlabeled sample in some instances, such as when the unlabeled sample is classified into a pure subset containing only other unlabeled samples and no known malware samples.

As described above, process 300 may represent a single run of an inverse imbalance subspace search process, at the conclusion of which one or more malware risk scores for the unlabeled samples in the proxy log samples may be incremented, while other malware risk scores might not be incremented based on the final subsets into which they are classified. As described below in reference to FIGS. 5-6, the malware detection system 102 may perform multiple runs of a similar or identical inverse imbalance subspace search process, using the same set of proxy log samples, during which the malware risk scores for the unlabeled samples are persisted in the memory of the malware detection system 102 so that they may be incremented multiple times in multiple runs.

Figure 4:
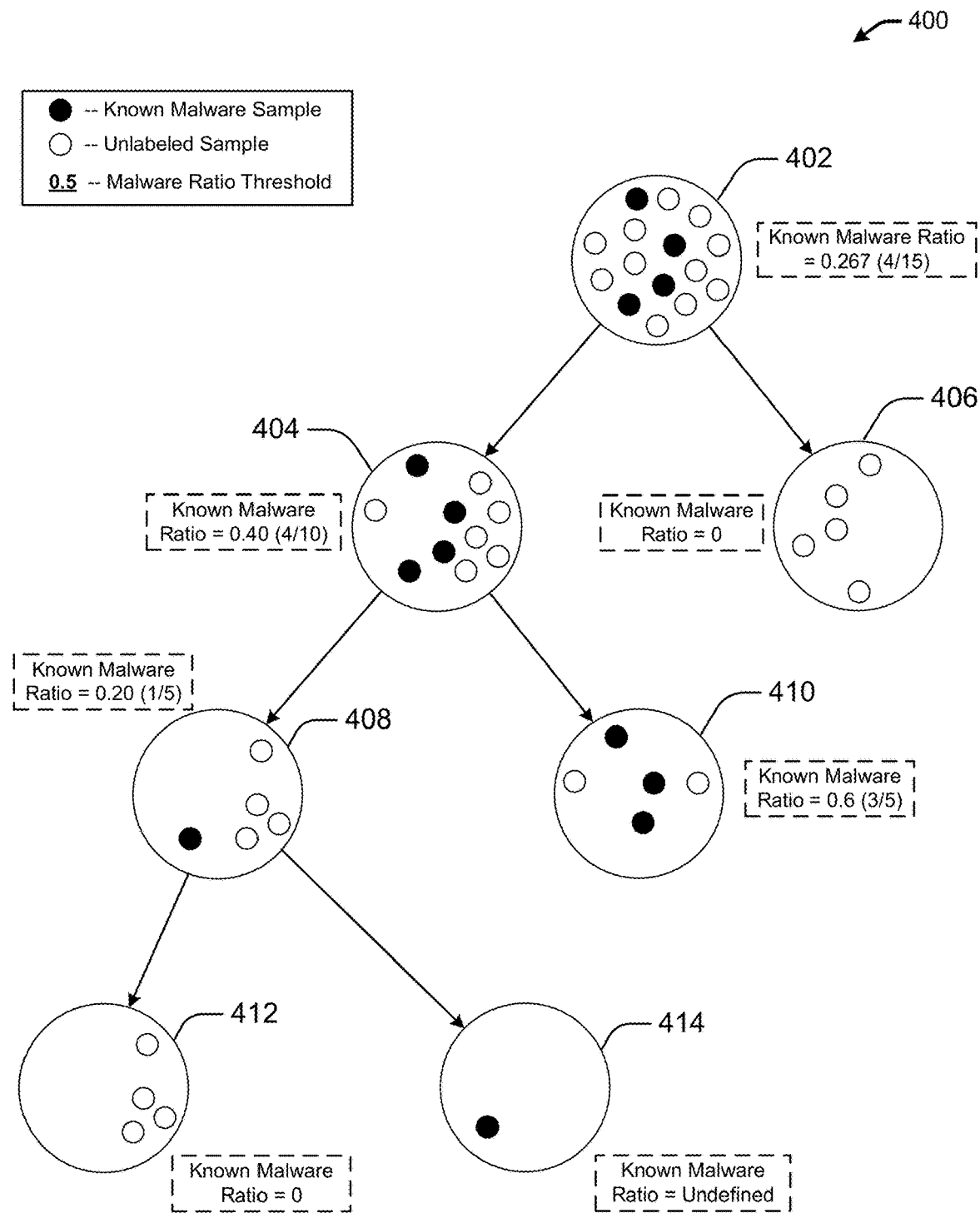
FIG. 4 is a diagram illustrating an inverse imbalance subspace search process on a mixed set of known malware and unlabeled samples, in accordance one or more techniques described herein.

FIG. 4 shows a diagram 400 graphically illustrating an example of an inverse imbalance subspace search process in accordance with certain techniques described herein. In some examples, the diagram 400 may illustrate one possible iteration/run of the inverse imbalance subspace search process 300 described above. Although this example shows a relatively small number of proxy log samples for illustrative purposes, the inverse imbalance subspace search techniques described herein can be performed on any sized sample set.

In this example, the malware detection system 102 has received an initial sample set 402 including fifteen (15) proxy log entries (or other network communication records). The malware detection system 102 may retrieve the labels associated with each of the initial sample set 402, indicating that the initial sample sets includes four (4) samples that are associated with known malware, and eleven (11) unlabeled samples. As shown adjacent to the initial sample set 402, the malware detection system 102 may calculate the known malware ratio of the initial sample set 402 as 0.267 (4 out of 15). Because the initial sample set 402 is mixed and the known malware ratio is less than the malware ratio threshold of 0.5 being used in this example, the malware detection system 102 may initiate a splitting process of the initial sample set 402 into two subsets based on a first feature and first feature value threshold. As noted above, the malware detection system 102 may use random selection processes to determine the first feature and/or first feature value threshold in some cases.

Splitting the initial sample set 402 in this example results in subset 404 and subset 406, into which each of the initial samples have been classified. As shown in diagram 400, subset 404 includes four (4) known malware samples and six (6) unlabeled samples, and thus the malware detection system 102 may calculate the known malware ratio of 0.4 (4 out of 10) for subset 404. Because subset 404 is mixed and the known malware ratio is less than the malware ratio threshold of 0.5, the malware detection system 102 may initiate another splitting process of subset 404 into two more subsets based on a second feature and/or second feature value threshold, which are different from the first feature and first feature value threshold.

In contrast, subset 406 includes no known malware samples and five (5) unlabeled samples. Thus, the malware detection system 102 may determine that subset 406 is a homogeneous subset without any known malware samples. As a result, malware detection system 102 may determine based on the homogeneity of subset 406 that this subset should not be split further and that no feature similarities can be determined between the unlabeled samples and any known malware samples.

Splitting the subset 404 in this example results in subset 408 and subset 410, into which each of the samples from subset 404 have been classified. As depicted in this example, subset 408 includes one (1) known malware sample and four (4) unlabeled samples, and thus the malware detection system 102 may calculate the known malware ratio of 0.2 (1 out of 5) for subset 408. Because subset 408 is mixed and the known malware ratio is less than the malware ratio threshold of 0.5, the malware detection system 102 may initiate another splitting process of subset 408 into two more subsets based on a third feature and/or third feature value threshold, which are different from either of the first or second features and feature value thresholds.

In this example, the splitting the subset 408 results in subset 412 and subset 414, each of which is homogeneous. Subset 412 includes no known malware samples and four (4) unlabeled samples. Thus, the malware detection system 102 may determine that subset 412 is another homogeneous subset without any known malware samples, and thus that this subset should not be split further and that no feature similarities can be determined between the unlabeled samples and any known malware samples. Subset 414 includes one (1) malware sample and no unlabeled samples. Thus, the malware detection system 102 may determine that subset 414 is also a homogeneous subset with only known malware samples, and thus that this subset should not be split further and that no feature similarities can be determined between the unlabeled samples and any known malware samples.

Returning to subset 410, the malware detection system 102 may determine that this subset includes three (3) known malware samples and two (2) unlabeled samples. Thus, the malware detection system 102 may calculate the known malware ratio of 0.6 (3 out of 5) for subset 410. Because subset 410 is a mixed subset having a known malware ratio greater than the malware ratio threshold of 0.5, the malware detection system 102 may determine that subset 410 need not be split further. The malware detection system 102 also may determine that, based on the known malware ratio of subset 410, that the unlabeled samples in subset 410 have sufficient feature similarities with known malware samples. Accordingly, the malware detection system 102 in this example may increment (or otherwise increase) malware risk scores associated with the two unlabeled samples in subset 410.

Figure 5:
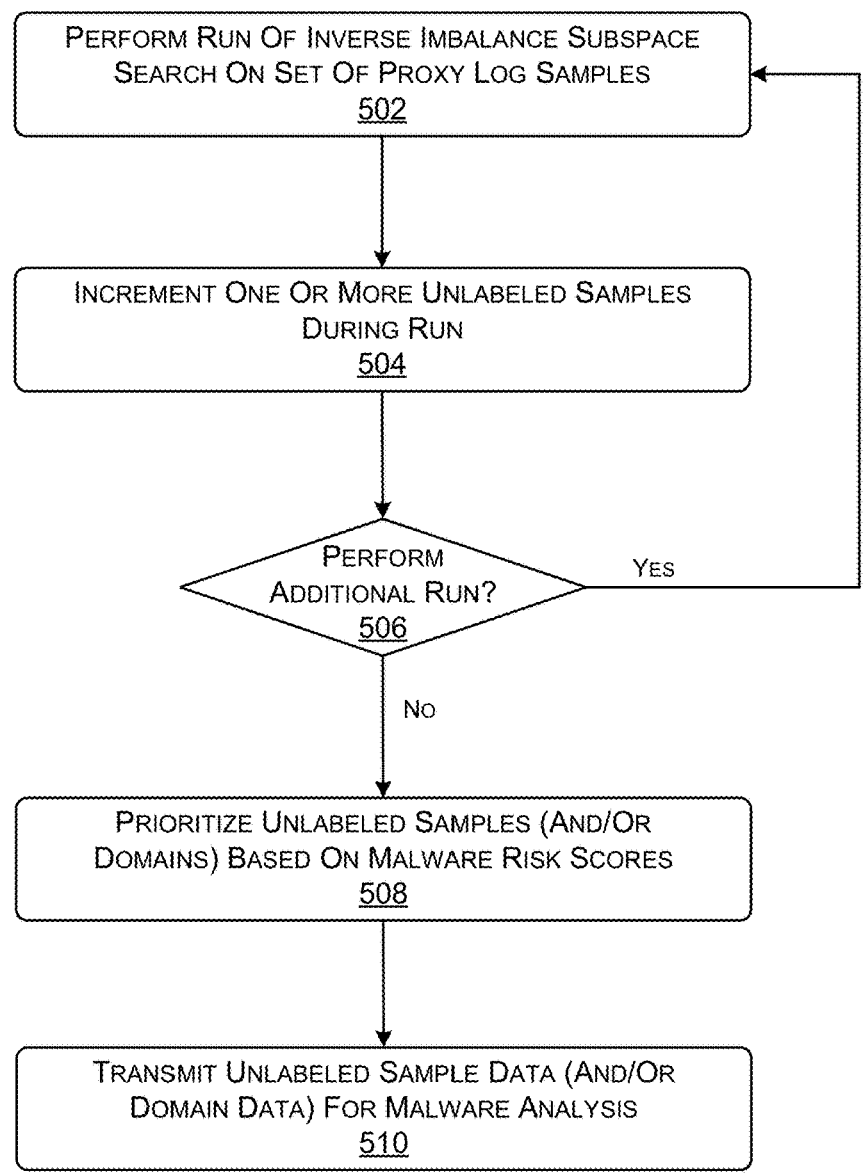
FIG. 5 illustrates an example process of performing repeated runs of an inverse imbalance subspace search on a sample set, in accordance one or more techniques described herein.

FIG. 5 illustrates a flow diagram for another example process 500 for executing multiple interactions (or runs) of an inverse imbalance subspace search on a sample set. As noted above, FIGS. 5 and 6 describe techniques of executing an inverse imbalance subspace search process multiple times on the same initial sample set. Accordingly, the operations of process 500 may be performed by a malware detection system 102 including components 112-116, based on proxy log data 108 received from one or more proxy servers 106, as described above in reference to FIG. 1. However, it should be understood that the operations described in process 500 also are not limited to the computing environment 100 described in FIG. 1, but may performed by any combination of the components, servers, and/or computing devices described herein.

At operation 502, the malware detection system 102 may perform a run of an inverse imbalance subspace search process based on an initial set of proxy log samples received from one or more proxy servers 106, or any other initial sample set of network communication records. At operation 504, during the inverse imbalance subspace search process (or at the conclusion of the process), the malware detection system 102 may increment or increase a set of malware risk scores associated with one or more unlabeled samples. Accordingly, in some examples operations 502 and 504 may correspond to a single run of an inverse imbalance subspace search process 300 described above, during which one or more unlabeled samples are determined to have sufficient feature similarities with known malware samples, and the malware risk scores for the updated samples are incremented.

At operation 506, the malware detection system 102 determines whether to initiate an additional run of the inverse imbalance subspace search process of operations 502 and 504. In some examples, the malware detection system 102 may be configured to execute a predetermined number of runs (e.g., 100, 500, 1000, 5000, etc.). Additionally or alternatively, the determination in operation 506 may be based on the current state of the malware risk scores for unlabeled samples. For instance, the malware detection system 102 may continue to perform runs of the inverse imbalance subspace search process until the malware risk scores for one or more unlabeled samples reaches a predetermine threshold value. In other instances, if the difference between the highest malware risk scores for unlabeled samples and the next closest set of malware risk scores is greater than a threshold amount or percentage, then the malware detection system 102 may determine that a sufficient number of runs have been performed to identify the highest priority unlabeled samples for further malware analysis. In such cases, the malware detection system may terminate the iterating loop (506: No). Otherwise, the malware detection system 102 may perform additional runs of the inverse imbalance subspace search process (506: Yes), during which the malware risk scores are persisted and may continue to be incremented. Additionally, the malware detection system 102 may select different sets of features and/or different feature value thresholds during different runs of the inverse imbalance subspace search process, so that the process may potentially produce a different outcome in which the malware risk scores of different unlabeled samples are incremented.

At operation 508, the malware detection system 102 may prioritize the unlabeled samples based on their aggregated malware risk scores during the iterative runs of the inverse imbalance subspace search process performed in operations 502-506. In some examples, the malware detection system 102 may select the N number of unlabeled samples having the largest malware risk scores. Additionally or alternatively, the malware detection system 102 may group (e.g., sum or average) multiple different malware risk scores for unlabeled samples associated with the same domain, and then may prioritize the domains having the largest aggregated malware risk scores, or largest average risk scores, etc. For example, referring briefly to FIG. 6, an example table 600 is shown including a prioritized listing of unlabeled samples based on malware risk scores. In this example, table 600 stores a sample identifier, malware risk score, source domain, and identifiers one or more similar samples (e.g., samples originating from the same source domain). Thus, as this example illustrates, the similarity among suspicious (e.g., unlabeled) samples and known malware samples may be based on the feature values, and need not be based on the domain names. In contrast to conventional systems, the techniques described herein may be used to determine identifiers of domain names having malware samples that are similar to known malware. Therefore, the techniques herein also may be used in improved security analyses, in which the identified domains may be subsequently analyzed and verified (e.g., by human analysts and/or automated processes) to confirm whether the suspicious domains are likely malware sources.

At operation 510, the malware detection system 102 may forward data associated with the prioritized unable samples (and/or prioritized domains) to an additional malware analysis component. In various examples, the malware detection system 102 may collect and forward data including the prioritized unlabeled samples, the domain(s) associated with the unlabeled samples, other unlabeled samples from the same source or domain, the similar known malware samples, the network path data associated with the unlabeled samples, the client devices affected by the unlabeled samples, etc.). As noted above, the malware detection system 102 may collect and forward the data associated with the prioritized unlabeled samples/domains to a malware analysis component and/or a risk assessment team for further analysis of the malware risk. In some examples, the malware analysis component may collect data for multiple associated unlabeled samples, such as samples having the same source domain, and may transmit the set of unlabeled samples for further analysis.

The above examples describe techniques for performing a single run (e.g., process 300) or multiple runs (e.g., process 500) of an inverse imbalance subspace search process, during which proxy log samples or other network communication records are analyzed and prioritized as being associated with potential malware, based on similarities with known malware samples. In certain implementations, these processes may be performed at the level of individual unlabeled samples, so that each unlabeled sample is analyzed, grouped into subsets with other samples, and assigned an individual malware risk score. However, in other examples, the techniques described herein may be performed at the domain or hostname level rather than the sample level. For instance, the malware detection system 102 may be configured to group multiple unlabeled samples associated related to each hostname, and may use a multiple instance embedding process to transform each group of samples into a vector representing the hostname. The vectors may then be analyzed and scored in a manner similar or identical to the analysis and scoring of unlabeled samples as described above.

Figure 7:
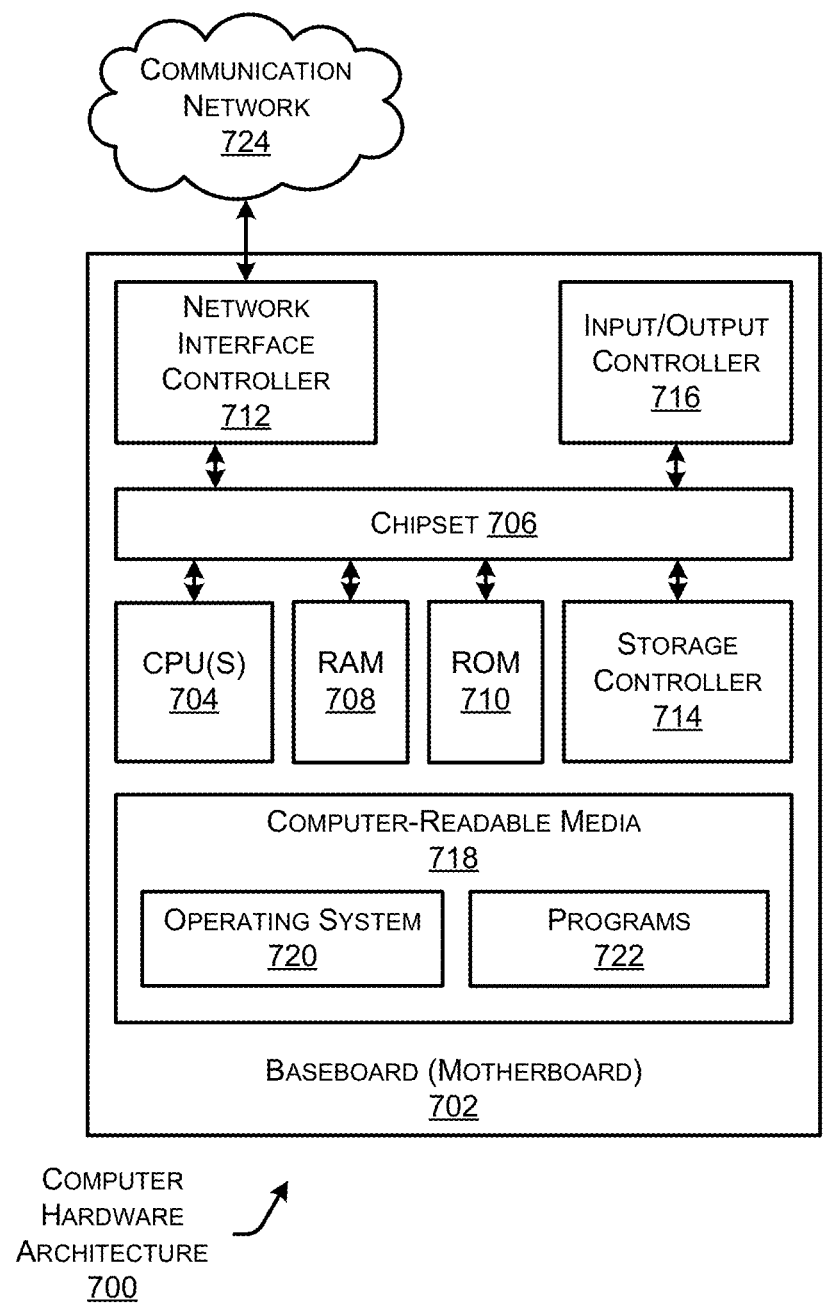
FIG. 7 illustrates a computer architecture diagram showing an example computer hardware architecture for implementing a computing device that can be utilized to implement aspects of the various technologies presented herein.

FIG. 7 illustrates a computer architecture diagram showing an example computer hardware architecture 700 for implementing a computer system (e.g., computing device, server, desktop, etc.) that can be utilized to implement aspects of the various technologies presented herein. For instance, the computer hardware architecture 700 shown in FIG. 7 may be used to implement one or more malware detection systems 102 configured to execute proxy log collection components 112, inverse imbalance subspace search components 114, and to maintain malware risk data within a malware risk score data store 116 as described above. In various implementations, the computer hardware architecture 700 may correspond one or more servers within a malware detection system 102, proxy servers 106, client devices (or nodes) 104 and/or various other components described herein. Computer hardware architecture 700 may correspond to one or more of a computer server and/or datacenter, computer workstation(s), desktop computer(s), laptops, tablets, network appliances, e-reader, smartphone, or other computing device, and can be utilized to execute any combination of the software components presented herein. The computer 700 may, in some examples, correspond to a network device, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices can be connected by way of a system bus or other electrical communication paths. In one illustrative configuration, one or more central processing units (CPUs) 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through one or more communication networks 724, such as the computing environment 100. Communication network(s) 724 may include one or more wired or wireless communication networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. The chipset 706 can include functionality for providing network connectivity through a Network Interface Controller (NIC) 712, such as a gigabit Ethernet adapter. The NIC 712 is capable of connecting the computer 700 to other computing devices over the computing environment 100. It may be appreciated that multiple NICs 712 can be present in the computer 700, connecting the computer to other types of networks and remote computer systems. In some examples, the NIC 712 may be configured to perform at least some of the techniques described herein, such as packet redirects and/or other techniques described herein.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different examples of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the storage device 718 described above, the computer 700 can have access to other computer-readable storage media to store and retrieve information, such as program modules, data structures, or other data. It may be appreciated by those skilled in the art that computer-readable storage media is any available media that provides for the non-transitory storage of data and that can be accessed by the computer 700. In some examples, the operations performed by the computing environment 100 and/or any components included therein, may be supported by one or more devices similar to computer 700. Stated otherwise, some or all of the operations performed by the computing environment 100, and/or any components included therein, may be performed by one or more computer devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one example, the operating system 720 comprises the LINUX operating system. According to another example, the operating system comprises the WINDOWS® SERVER operating system from MICROSOFT Corporation of Redmond, Wash. According to further examples, the operating system can comprise the UNIX operating system or one of its variants. It may be appreciated that other operating systems can also be utilized. The storage device 718 can store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

As described herein, the computer 700 may comprise one or more of a malware detection system 102, client device(s) 104, proxy server(s) 106, and/or network devices (e.g., server computer, computing resource, router, etc.). The computer 700 may include one or more hardware processor(s) such as the CPUs 704 configured to execute one or more stored instructions. The CPUs 704 may comprise one or more cores. Further, the computer 700 may include one or more network interfaces configured to provide communications between the computer 700 and other devices, such as the communications described herein as being performed by the malware detection system 102, the client devices 104, the proxy servers 106, or a network device or other computing device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth. For example, the network interfaces 712 may include devices compatible with the wired and/or wireless communication technologies and protocols described herein, including but not limited to Ethernet, Wi-Fi™, etc.

The programs 722 may comprise any type of programs or processes to perform the techniques described in this disclosure for receiving and analyzing sets of network communication data samples, including mixed samples with known malware and unlabeled samples, as well as executing inverse imbalance subspace searches, calculating malware risk scores and other metrics for unlabeled samples, and malware analysis components based on the malware detection system. The programs 722 may enable computer servers within the malware detection system 102 to perform the various operations described herein.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

What is claimed is:

1. A method comprising:
    receiving, by a computer system, a plurality of network communication records;
    classifying, by the computer system, the plurality of network communication records into two or more subsets based on a first feature and a first threshold associated with the first feature, wherein the two or more subsets includes a first subset;
    determining, within the first subset, a first malware ratio of a first number of network communication records that are associated with at least one known malware source to a second number of network communication records that are not associated with the at least one known malware source;

based at least in part on determining that the first malware ratio meets or exceeds a malware ratio threshold, incrementing a malware risk score associated with a first network communication record in the first subset;

detecting, by the computer system, a malware risk associated with the first network communication record, wherein the first network communication record is not associated with the at least one known malware source, and wherein detecting the malware risk is based on the incremented malware risk score; and initiating, by the computer system, a malware analysis of a network domain associated with the first network communication record, based at least in part on detecting the malware risk associated with the first network communication record.

2. The method of claim 1, wherein initiating the malware analysis of the network domain comprises:

retrieving data associated with one or more additional network communication records originating from the network domain; and transmitting the data associated with the additional network communication records originating from the network domain, to a malware analysis component.

3. The method of claim 1, wherein detecting the malware risk associated with the first network communication record comprises:

calculating at least one of a difference or a ratio between the first number and the second number.

4. The method of claim 1, wherein detecting the malware risk associated with the first network communication record comprises:

in response to determining that the first number of network communication records in the first subset that are associated with the at least one known malware source, is not greater than the second number of network communication records in the first subset that are not associated with the at least one known malware source:

determining a second feature, and a second threshold associated with the second feature;

classifying the first subset of network communication records into two or more additional subsets based on the second feature and the second threshold, wherein the two or more subsets includes at least a second subset;

determining a third number of the network communication records in the second subset that are associated with the at least one known malware source;

determining a fourth number of the network communication records in the second subset that are not associated with the at least one known malware source; and comparing the third number and the fourth number.

5. The method of claim 1, further comprising determining the first feature by randomly selecting the first feature from a predetermined list of network communication features.

6. The method of claim 5, further comprising determining the first threshold by:

determining a range of possible values associated with the first feature; and randomly selecting the first threshold from the range of possible values.

7. The method of claim 1, wherein the plurality of network communication records comprises one or more proxy server logs storing a plurality of network requests, each network request comprising a plurality of feature values.

8. The method of claim 1, wherein detecting the malware risk associated with the first network communication record comprises:

increasing a numeric value associated with the first network communication record by a first amount, in response to determining that the first subset includes a greater number of network communication records that are associated with the at least one known malware source than network communication records that are not associated with the at least one known malware source;

determining a second feature, and a second threshold associated with the second feature;

re-classifying the plurality of network communication records into two or more additional subsets based on the second feature and the second threshold, wherein the two or more additional subsets includes at least a second subset, and wherein the first network communication record is classified into the second subset; and increasing the numeric value associated with the first network communication record by the first amount, in response to determining that the second subset includes a greater number of network communication records that are associated with the at least one known malware source than network communication records that are not associated with the at least one known malware source.

9. A computer server comprising:

one or more processors; and one or more non-transitory computer-readable media storing instructions that, when executed by the one or more processors, cause the one or more processors to perform operations comprising:

receiving a plurality of proxy log entries;

classifying the plurality of proxy log entries into at least a first subset and a second subset, based on a first feature and a first threshold associated with the first feature;

determining within the first subset, a first malware ratio of a first number of the proxy log entries in the first subset that are associated with known malware to a second number of the proxy log entries in the first subset that are not associated with the known malware;

classifying based at least in part on the first malware ratio, the first subset into a third subset and a fourth subset, based on a second feature and a second threshold associated with the second feature;

determining, within the third subset, a second malware ratio of a third number of the proxy log entries in the third subset that are associated with the known malware to a fourth number of the proxy log entries in the third subset that are not associated with the known malware;

determining, based at least in part on the second malware ratio, a malware risk associated with a first proxy log entry in the third subset; and performing a malware analysis associated with a network domain, based at least in part on determining the malware risk associated with the first proxy log entry.

10. The computer server of claim 9, wherein performing the malware analysis comprises:
   retrieving one or more additional proxy log entries associated with the network domain;
   analyzing the additional proxy log entries to determine one or more proxy log entry characteristics; and
   transmitting the proxy log entry characteristics to a malware analysis component.

11. The computer server of claim 9, wherein determining the malware risk associated with the first proxy log entry comprises:
   in response to determining that the first number of the proxy log entries in the first subset that are associated with the known malware, is greater than the second number of the proxy log entries in the first subset that are not associated with the known malware:
      incrementing a numeric value associated with the first proxy log entry; and
      comparing the incremented numeric value associated with the first proxy log entry, to at least one other numeric value associated with at least one other proxy log entry.

12. The computer server of claim 9, further comprising determining the first feature by randomly selecting the first feature from a predetermined list of proxy log features.

13. The computer server of claim 12, further comprising determining the first threshold by;
   determining a range of possible values associated with the first feature; and
   randomly selecting the first threshold from the range of possible values.

14. The computer server of claim 9, wherein determining the malware risk associated with the first proxy log entry comprises:
   incrementing a numeric value associated with the first proxy log entry, in response to determining that the first subset includes a greater number of proxy log entries that are associated with the known malware than proxy log entries that are not associated with the known malware;
   determining a second feature associated with the plurality of proxy log entries, and a second threshold associated with the second feature;
   re-classifying the plurality of proxy log entries into at least a third subset and a fourth subset, based on the second feature and the second threshold, wherein the first proxy log entry is classified into the third subset; and
   incrementing the numeric value associated with the first proxy log entry, in response to determining that the third subset includes a greater number of proxy log entries that are associated with the known malware than proxy log entries that are not associated with the known malware.

15. A non-transitory computer-readable medium storing processor-executable instructions that, when executed by one or more processors, cause the one or more processors to perform operations comprising:
   receiving proxy log data comprising data representing a plurality of proxy log entries;
   classifying the plurality of proxy log entries into at least a first subset and a second subset, based on a first feature and a first threshold associated with the first feature;
   determining within the first subset, a first malware ratio of a first number of the proxy log entries in the first subset that are associated with known malware to a second number of the proxy log entries in the first subset that are not associated with the known malware;
   based at least in part on determining that the first malware ratio meets or exceeds a malware ration threshold, incrementing a malware rick score associated with a first proxy log entry in the first subset;
   determining a malware risk associated with the first proxy log entry in the first subset, wherein the first proxy log entry is not associated with the known malware, and wherein determining the malware risk is based on the incremented malware risk score; and
   performing a malware analysis associated with the first proxy log entry, based at least in part on determining the malware risk associated with the first proxy log entry.

16. The non-transitory computer-readable medium of claim 15, wherein determining the malware risk associated with the first proxy log entry comprises:
   in response to determining that the first number of the proxy log entries in the first subset that are associated with the known malware, is not greater than the second number of the proxy log entries in the first subset that are not associated with the known malware:
      determining a second feature associated with the proxy log data, and a second threshold associated with the second feature;
      classifying the first subset of proxy log entries into at least a third subset and a fourth subset, based on the second feature and the second threshold;
      determining a third number of the proxy log entries in the third subset that are associated with the known malware;
      determining a fourth number of the proxy log entries in the third subset that are not associated with the known malware; and
      incrementing a numeric value associated with the first proxy log entry, in response to determining that the third number of the proxy log entries in the third subset that are associated with the known malware, is greater than the fourth number of the proxy log entries in the third subset that are not associated with the known malware
      comparing the incremented numeric value associated with the first proxy log entry, to at least one other numeric value associated with at least one other proxy log entry.

17. The non-transitory computer-readable medium of claim 15, further comprising determining the first feature by randomly selecting the first feature from a predetermined list of proxy log features.

* * * * *